(12) United States Patent
Nakamura

(10) Patent No.: US 6,308,825 B1
(45) Date of Patent: Oct. 30, 2001

(54) PLASTIC CHAIN AND PIN RETAINER

(75) Inventor: Tsuyoshi Nakamura, Tokyo (JP)

(73) Assignee: Yamakyu Chain Co., Ltd., Tokyo (JP)

( * ) Notice: Subject to any disclaimer, the term of this patent is extended or adjusted under 35 U.S.C. 154(b) by 0 days.

(21) Appl. No.: 09/511,491

(22) Filed: Feb. 23, 2000

(30) Foreign Application Priority Data

Mar. 25, 1999 (JP) .................................................. 11-081947

(51) Int. Cl.$^7$ .................................................. B65G 17/06
(52) U.S. Cl. .......................................................... 198/853
(58) Field of Search .............................. 198/844.1, 850, 198/851, 852, 853

(56) References Cited

U.S. PATENT DOCUMENTS

| | | |
|---|---|---|
| 4,995,801 * | 2/1991 | Hehl .................................. 425/151 X |
| 5,020,659 | 6/1991 | Hodlewsky . |
| 5,215,185 | 6/1993 | Counter et al. . |
| 5,247,789 * | 9/1993 | Abbestam et al. .................... 59/78 X |
| 5,253,749 | 10/1993 | Ensch . |
| 5,293,989 | 3/1994 | Garbagnati . |
| 5,303,818 * | 4/1994 | Gruettner et al. .................... 198/850 |
| 5,613,597 | 3/1997 | Palmear et al. . |
| 5,797,820 | 8/1998 | Endo . |
| 5,904,241 * | 5/1999 | Verdigets et al. .................... 198/853 |

FOREIGN PATENT DOCUMENTS

| | | |
|---|---|---|
| 0380202 | 8/1990 | (EP) . |
| 0459691 | 12/1991 | (EP) . |
| 0598453 | 5/1994 | (EP) . |
| 11314722 | 11/1969 | (JP) . |

OTHER PUBLICATIONS

An English Language abstract of JP 11-314722.

* cited by examiner

Primary Examiner—Christopher P. Ellis
Assistant Examiner—Kenneth W Bower
(74) Attorney, Agent, or Firm—Greenblum & Bernstein, P.L.C.

(57) ABSTRACT

A plastic conveyor chain includes a plurality of plastic link elements connected with each other by connecting pins extending through respective pin holes in the link elements. A retainer device retains the connecting pins in the pin holes, and includes a plug which is normally retained by the link element and which is thus prevented from being lost. The plug is movable in a direction intersecting with an axial direction of the connecting pin, between a first position and a second position. In the first position, the plug is partly situated in the pin hole for normally preventing an unintended axial withdrawal of the connection pin from the pin hole. In the second position, the plug is retracted from the pin hole for allowing an intended axial withdrawal of the connecting pin from the pin hole whenever necessary.

15 Claims, 7 Drawing Sheets

[Fig.1]
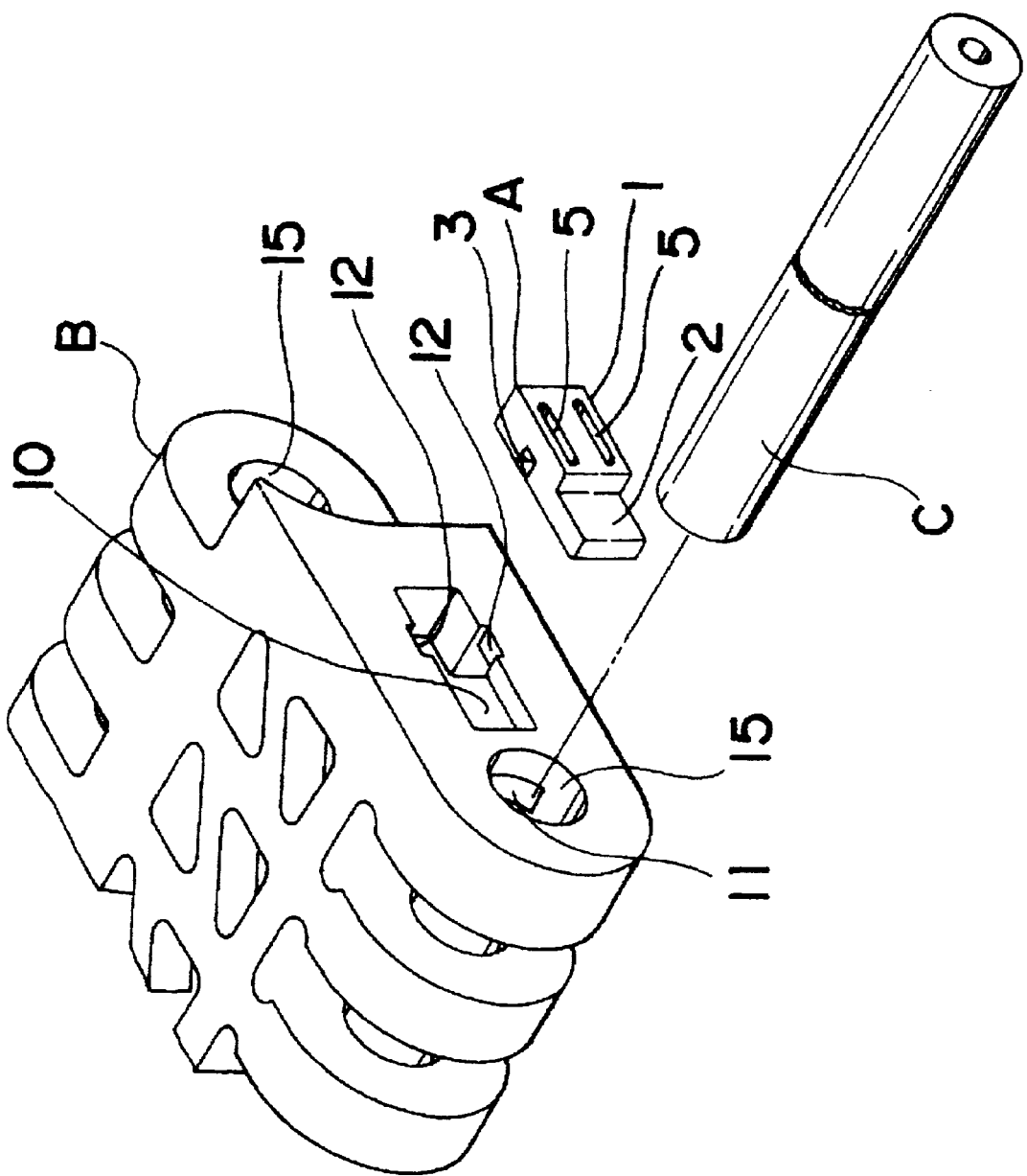

[Fig.2]
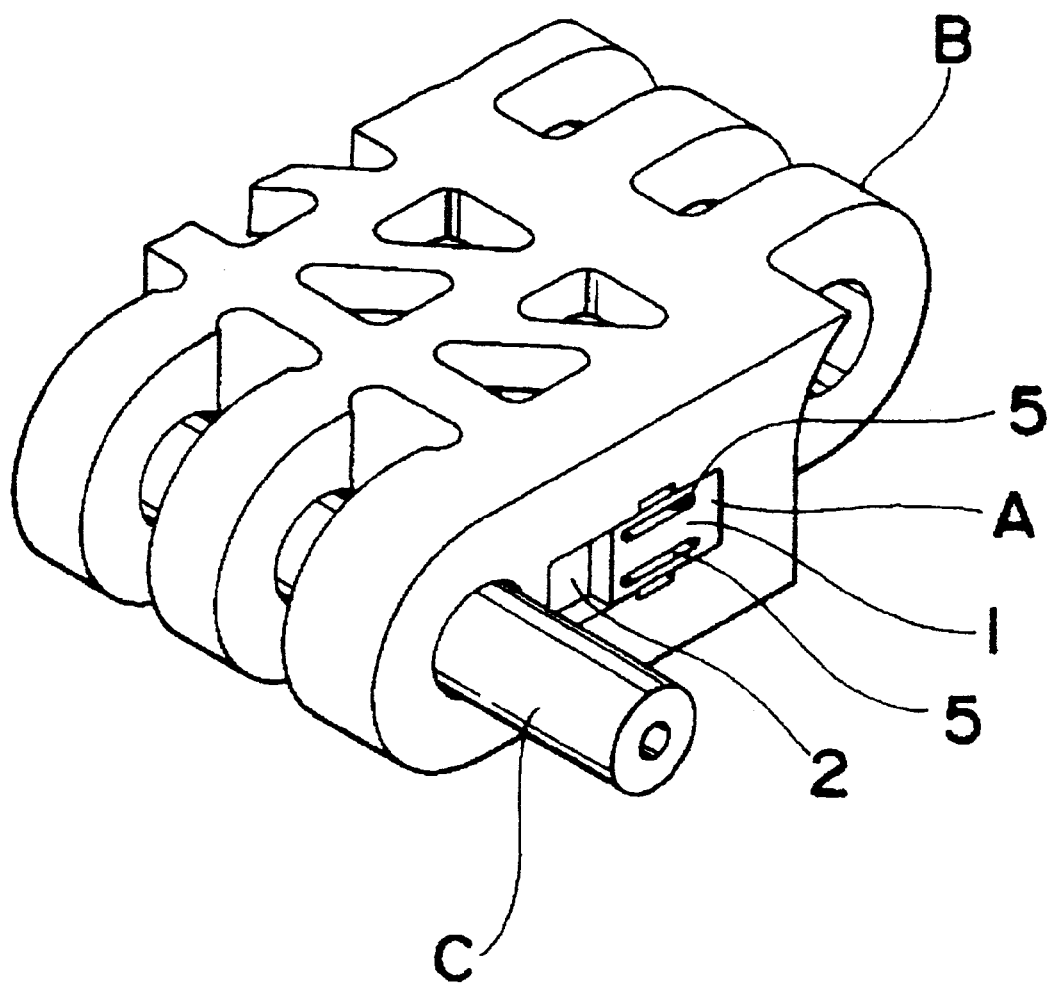

[Fig.3]
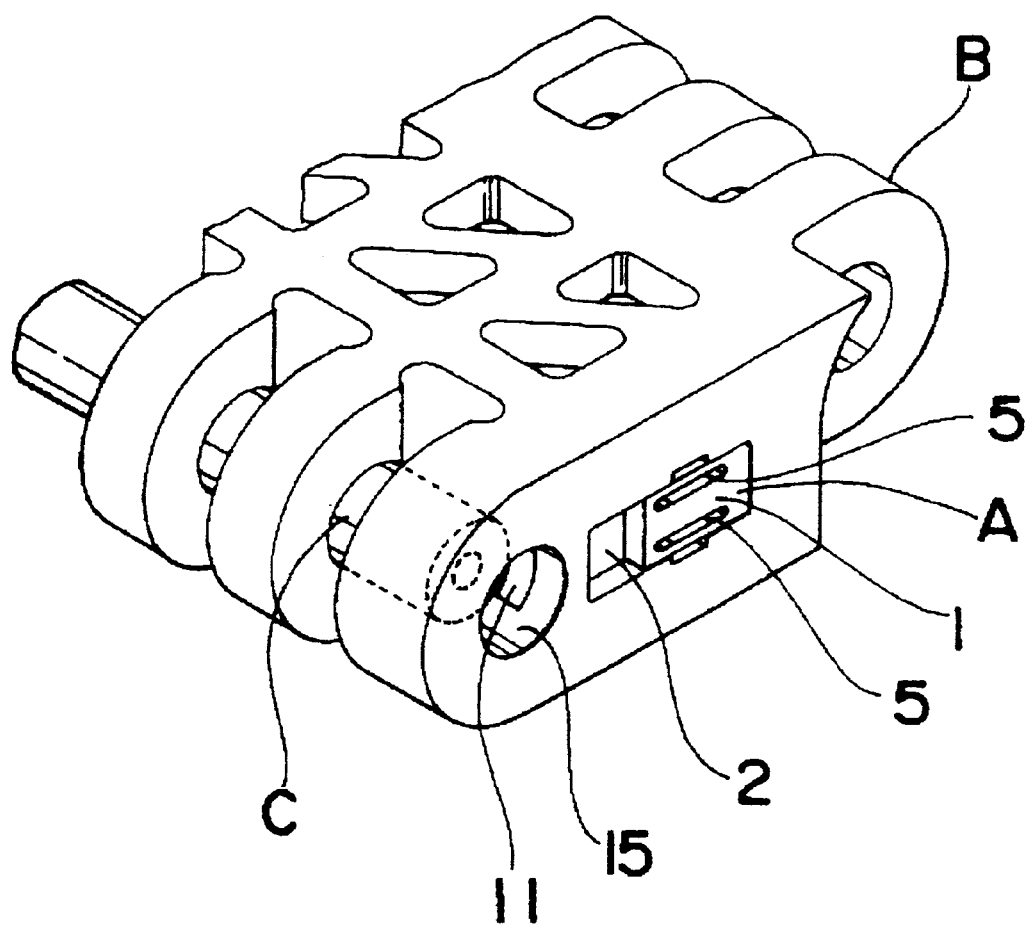

[Fig.4]
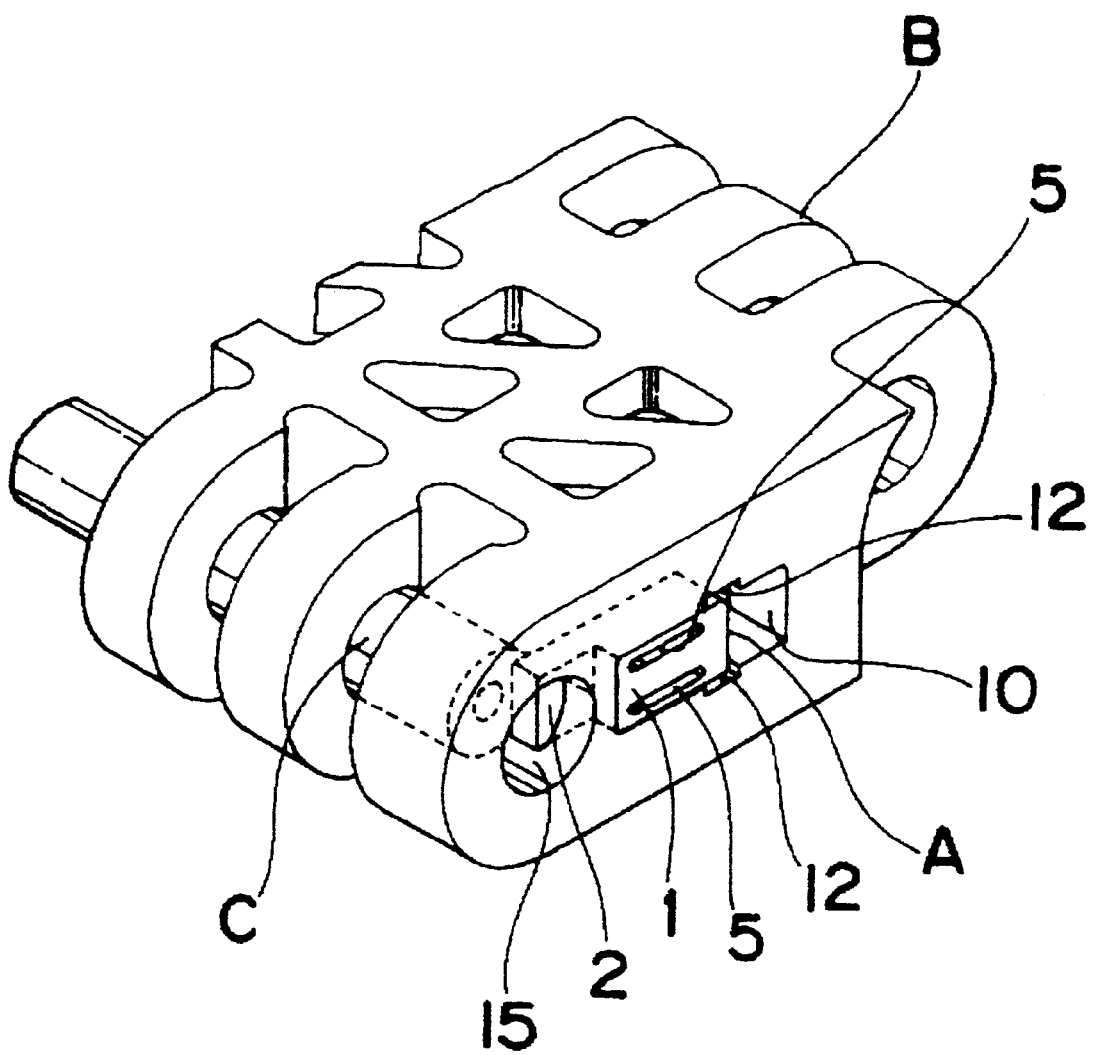

[Fig.5]
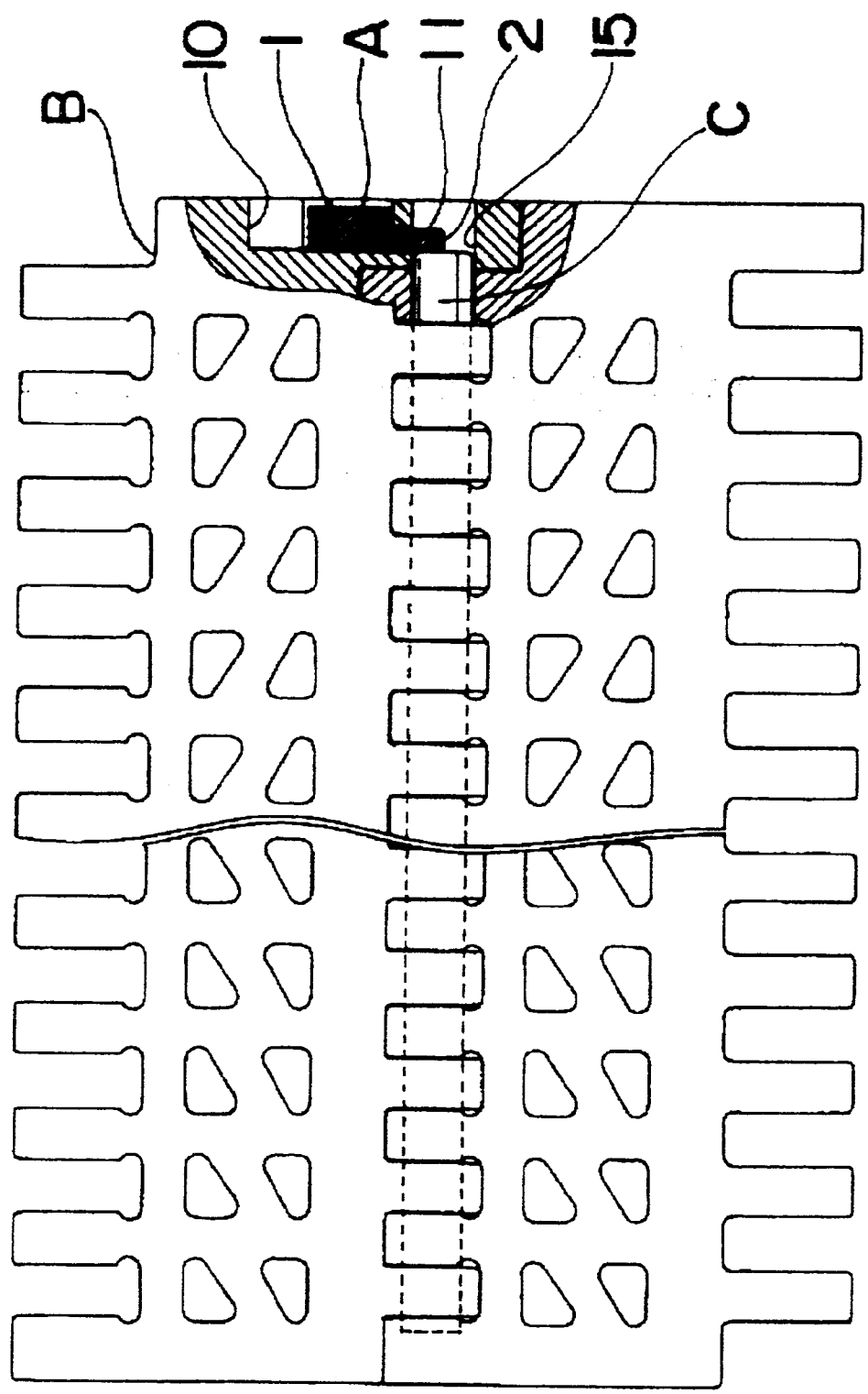

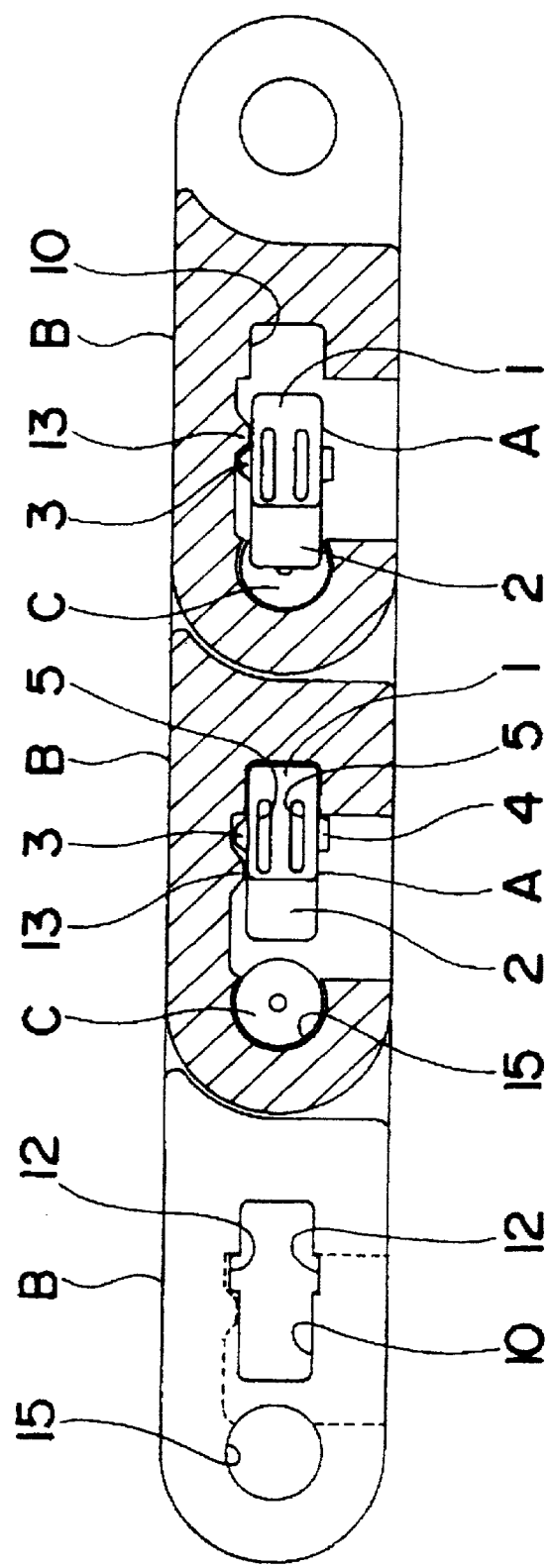
[Fig.6]

[Fig.7]
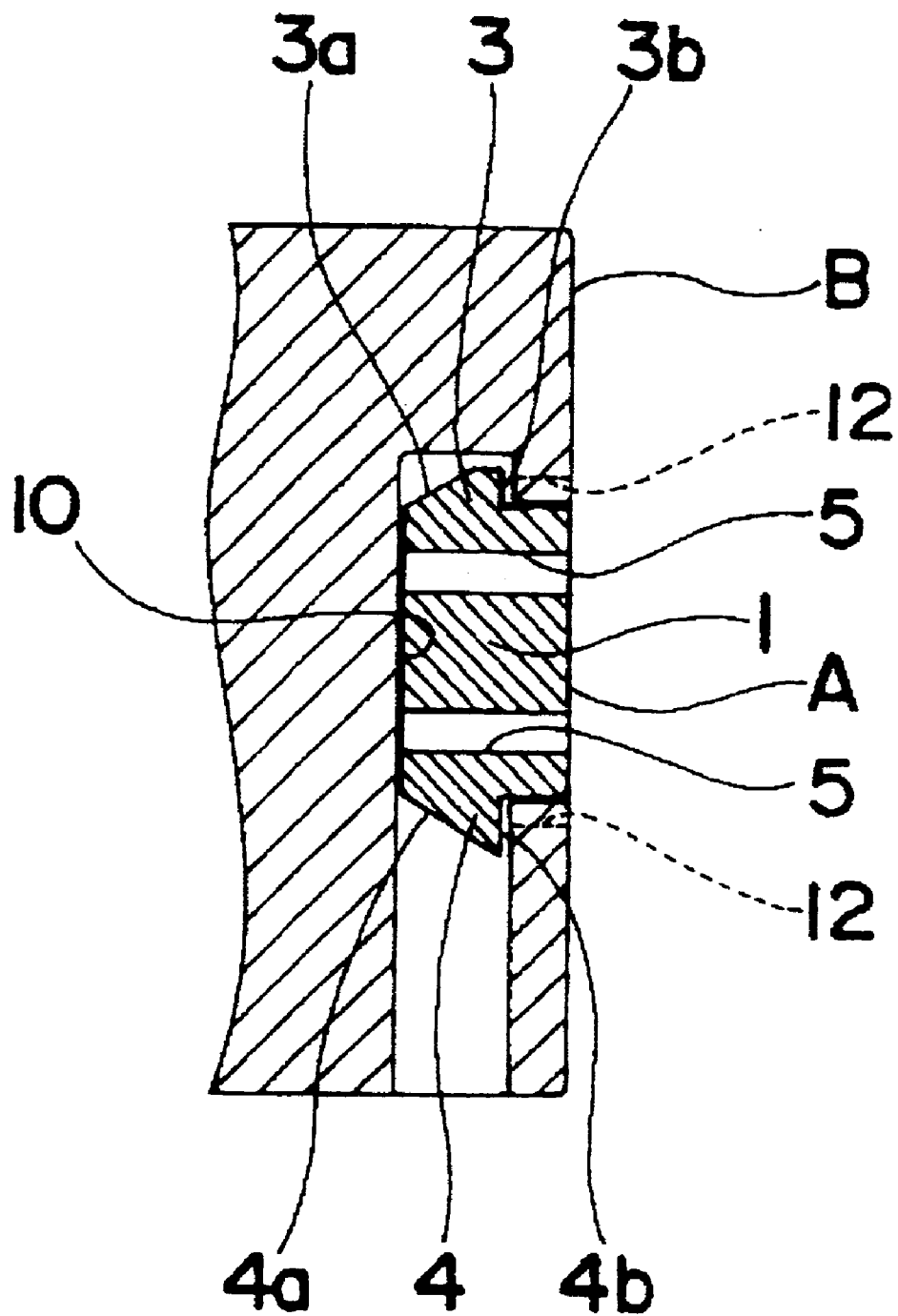

PLASTIC CHAIN AND PIN RETAINER

BACKGROUND OF THE INVENTION

1. Field of the Invention

The present invention relates to a plastic conveyor chain wherein a plurality of plastic link elements are connected with each other by connecting pins extending through pin holes in the link elements.

2. Description of the Related Art

In this type of plastic conveyor chain, it is a conventional practice to provide a retainer device for normally retaining the connecting pins in the pin hole and preventing them from being unintentionally removed from the pin holes, so that they can be readily disengaged from the pin holes whenever necessary. To this end, for example, the conveyor chain is provided with plugs each having a plurality of deformable legs which are forcedly driven axially into the pin hole and engaged with a recess in the inner peripheral surface of the pin hole.

However, in order to remove the connecting pins from the pin holes, it is necessary to temporarily remove the plugs from the pin holes in advance. Not only is the removal of the plugs from the pin holes troublesome and time-consuming, but also the plugs are lost quite frequently. When the plug is lost, the plug is often mixed with articles to be transferred by the conveyor chain.

SUMMARY OF THE INVENTION

It is therefore a primary object of the present invention to provide an improved plastic conveyor chain that eliminates the above-mentioned drawbacks of the prior art.

It is a specific object of the present invention to provide an improved plastic conveyor chain including a plug which assures a smooth side sliding movement of the link elements in operation of the conveyor chain.

It is another object of the present invention to provide an improved plastic conveyor chain including a plug which positively prevents undesired disengagement of the connecting pin from the pin hole, while allowing the connecting pins to be simply and quickly disengaged form the pin hole whenever necessary.

It is another object of the present invention to provide an improved plastic conveyor chain including a plug which is simple in structure, easy to use, superior in durability, and less expensive to produce.

These and other objects and advantages can be attained by the present invention which provides a conveyor chain comprising a plurality of plastic link elements connected with each other by connecting pins extending through respective pin holes in the link elements, and retainer means for retaining the connecting pins in the pin holes.

According to the present invention, the retainer means comprises a recess formed in each chain link element in its side surface at a location adjacent to the pin hole, and a communication hole formed in each chain link element for communicating the recess with the pin hole. The retainer means further comprises a plug that is accommodated in the recess so as to be movable toward and away from the pin hole. The plug has a proximal end which is slidably movable in the recess, and a distal end which is inserted into the communication hole such that the distal end is moved into, and retracted from the pin hole as the proximal end is moved in the recess toward and away from the pin hole.

In the conveyor chain according to the present invention, the plug of the retainer means is positively retained in the recess of the link element and serves to normally prevent an unintended axial withdrawal of the connecting pin from the pin hole, and the plug is effectively prevented from being lost without inhibiting a smooth side sliding movement of the link elements in operation of the conveyor chain. Further, only by slidingly moving the plug within the recess toward and away from the pin hole, it is possible to simply and promptly effect a changeover of the conveyor chain between a mode in which the connecting pin can be positively retained in the pin hole and another mode in which the connecting pin can be removed therefrom. The retainer means is functionally advantageous, easy to use, substantially free from troubles in operation, suitable for mass-production and inexpensive.

Advantageously, the conveyor chain according to the present invention further comprises lock means for normally retaining the plug in a lock position in which the distal end of the plug is situated in the pin hole. Thus, the plug is normally prevented from being moved away from the pin hole even when vibrations or external forces are applied to the chain during the operation, thereby positively preventing an unintended axial withdrawal of the connecting pin out of the pin hole.

In this instance, the lock means may comprise projections formed on opposite side surfaces of the plug and recess, wherein the projections ride over each other as the plug is slidingly moved into, and from the lock position. Such arrangement of the lock means is simple in structure and easy to produce, and does not essentially increase the cost.

Advantageously, the proximal end and the distal end of the plug are in the form of a base part and an extension, respectively. In this instance, the base part may be formed with a slit at location adjacent to the projection, for affording a flexibility to the base part of the plug such that it can be resiliently deformed. The deformability of the base part as afforded by the slit ensures that the plug can be readily installed into the corresponding recess in the base part, and that the projections on the opposite side surfaces of the plug and recess are allowed to smoothly ride over the other as the plug is slidingly moved toward and away from each other.

Preferably, the base part of the plug is provided with projection or projections on upper and lower surfaces thereof, which can be maintained in engagement with corresponding edges of the recess. In this instance, after the plug has been installed into the recess, the projections in engagement with the edges of the recess serve to retain the plug in place, thereby positively preventing an unintended removal of the plug out of the recess through its front opening.

DETAILED DESCRIPTION OF THE DRAWING

FIG. 1 is an exploded perspective view showing a plastic link element, a connecting pin and a retainer therefor, in a conveyor chain according to one embodiment of the present invention;

FIGS. 2 to 4 are exploded perspective views similar to FIG. 1, showing the manner of assembling the connecting pin into the link element and retaining the same in place;

FIGS. 5 and 6 are plan view and locally broken side view of the conveyor chain which is comprised of link elements shown in FIG. 1; and FIG. 7 is a longitudinal sectional view showing the detail of the retainer as shown in FIGS. 1 to 6.

DETAILED DESCRIPTION OF THE PREFERRED EMBODIMENT

The present invention will be further described below with reference to a preferred embodiment shown in the accompanying drawings.

Briefly stated, the present invention provides an improved plastic conveyor chain includes a retainer device wherein a plug A is provided for a plastic link element B to prevent unintentional removal of a connecting pin C from a pin hole in the link element B. The connecting pin C is formed of an appropriate material, such as suitable metal, synthetic resin or composite material.

As shown in FIG. 1, the plastic conveyor chain to which the present invention is applied includes a plurality of plastic link elements B which are connected with each other by connecting pins C successively in the longitudinal direction, or in a side-by-side relationship in the width direction. The connecting pin C is passed through a pin hole 15 in the link element B, and is normally retained in the pin hole 15 by the plug A such that it is prevented from an unintentional withdrawal from the pin hole 15. The connecting pin C is arranged such that it can be readily removed from pin hole 15 whenever necessary, e.g., when the link element B or the connecting pin A has worn and is thus to be replaced, or when the connection between adjacent link elements is to be released.

The link element B is formed with a substantially rectangular recess 10 in its side surface at a location adjacent to the pin hole 15, and also with a communication hole 11 for communicating the recess 10 and the pin hole 15 with each other. The recess 10 serves to accommodate the plug A therein, such that the plug A can be moved along the recess 10 toward and away from the pin hole 15. In the illustrated embodiment, the plug A has a proximal end which is in the form of a base part 1, and a distal end which is in the form of an extension formed of a substantially rectangular thick plate 2. The base part 10 is arranged in the recess 10 so as to be slidably movable toward and away from the pin hole 15. On the other hand, the extension plate 12 extends through the communication hole 11 such that it can be projected into, and retracted from the pin hole 15 as the base part 11 of the plug A undergoes a sliding movement in the recess 10.

The plug A normally assumes a position in which the extension plate 2 projects into the pin hole 15 in order to retain the connecting pin C in the pin hole 15, and thereby prevent an unintended axial removal of the connecting pin C from the pin hole 15. When the plug A is moved in the recess so that the extension plate 2 is retracted from the pin hole 15, the connecting pin C can be readily removed from the pin hole 15 in its axial direction.

The base part 1 of the plug A has upper side lower end surfaces that are provided with engagement projections 3 side 4, respectively. The base part 1 is further formed with slits 5 at locations adjacent to the upper and lower end surfaces or between these end surfaces. Incidentally, the plug A is forced into the recess 10 from its open side in the side surface of the link element B.

The base part 1 is formed so as to ensure a smooth sliding movement thereof the in the recess 10, and is maintained in contact with the inner surface of the recess 10 at its upper and lower end surfaces and also at its rear surface.

The extension plate 2 of the plug A has a front surface, a rear surface and upper and lower end surfaces which are in contact with the inner surface of the communication hole 11. The length of the extension plate 2 is determined so that the extension plate 2 is advanced in the communication hole 11 to project into the pin hole 15 when the base part 1 is moved in the recess 10 toward the pin hole 15, whereas the extension plate 2 is retracted from the pin hole 15 when the base part 1 is moved in the recess 10 away from the pin hole 15. The length of the extension plate 2 may be such that the extension plate 2 partly remains in the communication hole 11 in its retracted position.

The advanced position of the extension plate 2 may be defined by an abutment of the tip end of the extension plate 2 against the inner peripheral surface of the pin hole 15. Alternatively, however, the advanced position of the extension plate 2 may be defined by an abutment of the base part 1 against the edge of the communication hole 11 at its junction with the recess 10. In this instance, the length of that portion of the extension plate 2, which projects into the pin hole 15, may be appropriately determined in view of the retaining force required for the connecting pin C, the dimension of the conveyor chain, etc.

The engaging projections 3, 4 on the upper and lower side surfaces of the base part 1 are provided in order to ensure that, when the plug A is accommodated in the recess 10, the plug A is prevented from escaping out of the recess 10 through its open side. As shown in FIG. 7, the rear side of each engaging projection 3, 4 is in the form of an inclined surface 3a, 4a. Thus, the engaging projections 3, 4 can be readily passed through local cutouts 12 when the plug A is to be inserted into, or removed from the recess 10. These cutouts 12 may be arranged at the center regions of the upper and lower surfaces of the recess 10. As also shown in FIG. 7, the engaging projections 3, 4 and the main body, i.e., the remainder of the base part 1 define shoulders 3b, 4b therebetween, which are engaged with corresponding engaging edges on the upper and lower surfaces of the recess 10 after the plug A has been inserted into the recess 10. The engagement of the shoulders 3b, 4b and the corresponding edges with each other serves prevent undesired withdrawal of the plug A through the front opening of the recess 10.

Furthermore, as shown in FIG. 6, the engaging projection 3 which is situated on the upper side of the base part 1 has inclined surfaces on both sides as seen from its front surface side, i.e., on its side which is opposite to the communication hole 11 and on its other side which is remote from the communication hole 11. The upper surface of the recess 10 is formed with a corresponding projection 13 which is so arranged that the engaging projection 3 rides over the projection 13 as the plug A is moved toward and away from the pin hole 15. It is thus possible to positively prevent an undesired retracting movement of the plug A in the direction away from the pin hole 15. When the plug A has been forcedly moved to its fully retracted position, from its normal, advanced position in which the extension plate 2 projects into the pin hole 15 to prevent an axial withdrawal of the connecting pin B, the entirety of the plug A is situated in the recess 10. It is thus possible readily to remove the plug A from the recess 10 through its front opening.

The slits 5 having an elongate shape are arranged in the base part 1 at locations adjacent to the engaging projections 3, 4 on the upper and lower surfaces, such that those regions of the base part 1, which are provided with the engaging projections 3, 4, are afforded with a flexibility or deformability. Due to the provision of such slits 5, the base part 1 can be resiliently deformed in the vertical direction whenever necessary. This is the case where the plug A is to be inserted into the recess 10 and the shoulders 3b, 4b of the engaging projections 3, 4 are engaged with the corresponding engaging edges of the recess 10, or where the plug A is moved toward and away from the pin hole 15 and the engaging projection 3 of the base part 1 rides over the projection 13 of the recess 10. Incidentally, instead of providing two slits adjacent to the upper and lower surfaces of the base part 1 as in the illustrated embodiment, there may be provided a single slit or opening at a center region of the base part 1 between the upper and lower surfaces thereof.

It will be appreciated that the present invention provides a plastic conveyor chain including an improved plug which assures a smooth side sliding movement of the link elements in operation of the conveyor chain, which positively prevents undesired disengagement of the connecting pin from the pin hole, while allowing the connecting pins to be simply and quickly disengaged form the pin hole whenever necessary, and which is simple in structure, easy to use, superior in durability, and less expensive to produce.

While the present invention has been described above with reference to a preferred embodiment, various changes and/or modifications may be made within the scope of the invention as defined by the appended claims, for example, in terms of:

the constitution, shape, dimension and material of the plug A;

the constitution, shape and dimension of the base part 1 of the plug A;

the constitution, shape and dimension of the plate 2 of the plug A;

the constitution, shape, dimension, position and number of the engaging projections 3, 4;

the constitution, shape, dimension, position and number of the slits 5;

the constitution, shape and dimension of the link element B;

the constitution, shape, dimension and position of the recess 10;

the constitution, shape, dimension and position of the communicating hole 11;

the constitution, shape, dimension and position of the cutouts 12;

the constitution, shape, dimension, position and number of the engaging projection 13;

the constitution, shape, dimension and position of the pin hole 15;

the constitution, shape, dimension and the material of the connecting pin C; and the constitution, type, shape dimension and application of the assembled chain.

What is claimed is:

1. A conveyor chain comprising:

a plurality of plastic link elements connected with each other by connecting pins extending through respective pin holes in said plurality of link elements; each link element of said plurality of link elements comprising:

a recess in a side surface of said link element and being adjacent to the pin hole; and a communication hole for communication between said recess and the pin hole; and a retainer device for retaining the said connecting pins in the pin holes, said retainer device comprising:

a plug which is configured to be retained by the link element and is movable in a direction which intersects with an axial direction of the connecting pin, between a first position in which said plug is partly situated in the pin hole for preventing unintentional axial withdrawal of the connection pin from the pin hole, and a second position in which said plug is retracted from the pin hole for allowing intended axial withdrawal of the connecting pin from the pin hole; said plug being accommodated in said recess and configured for movement toward and away from the pin hole, said plug having a proximal end and configured for sliding movement in said recess, and a distal end and configured to be inserted into the communication hole such that the distal end is configured for insertion into and retraction from the pin hole as the proximal end is respectively moved in said recess toward and away from the pin hole; and a lock configured to retain said plug in said first position in which said distal end of said plug is positioned in the pin hole, said lock comprising plug projections on opposite side surfaces of said plug, and recess projections on opposite side surfaces of said recess, a said plug projection and a said recess projection configured to ride over each other as said plug is moved between said first position and said second position.

2. The conveyor chain as set forth in claim 1, wherein said proximal end of said plug comprises a base part, and said distal end of said plug comprises an extension connected to said base part.

3. The conveyor chain as set forth in claim 2, wherein said plug projections are configured to be maintained in engagement with corresponding edges of the recess.

4. The conveyor chain as set forth in claim 1, wherein the proximal end of the plug comprises a base part having a slit at a location adjacent to a said plug projection, said slit configured to provide resilient deformation of said base part.

5. The conveyor chain as set forth in claim 1, wherein said plurality of link elements are configured to be successively connected to each other in a side-by-side relationship in a width direction of said conveyor chain.

6. The conveyor chain as set forth in claim 1, wherein each said link element comprises link ends having substantially the same distance from each other and substantially the same width.

7. A retainer device for retaining connecting pins in respective pin holes of respective ones of a plurality of link elements, the plurality of link elements interconnected by the respective connecting pins which extend through the respective pin holes in each link element, each link element having a recess in a side surface of said link element and being adjacent to the pin hole, and a communication hole for communicating between said recess with the pin hole, said retainer device comprising:

a plug which is configured to be retained by the link element, the plug being movable in a direction which intersects with an axial direction of the connecting pin, between a first position in which said plug is partly situated in the pin hole for preventing unintentional axial withdrawal of the connection pin from the pin hole, and a second position in which said plug is retracted from the pin hole for allowing intended axial withdrawal of the connecting pin from the pin hole, said plug being accommodated in said recess and configured for movement toward and away from said pin hole, said plug having a proximal end comprising a base part configured for sliding movement in said recess, and a distal end comprising an extension configured for insertion into said communication hole, wherein said extension is moved into and retracted from the pin hole, as the base part is respectively moved in said recess toward and away from the pin hole; and a lock configured to retain said plug in said first position in which said distal end of said plug is positioned in the pin hole, said lock comprising plug projections on opposite side surfaces of said plug, and recess projections on opposite side surfaces of said recess, a said plug projection and a said recess projection configured to ride over each other as said plug is moved between said first position and said second position.

8. The retainer device according to claim 7, wherein said plug projections are configured to be maintained in engagement with corresponding edges of the recess.

9. The retainer device as set forth in claim 7, wherein:

said lock further comprises a slit formed in said base part of said plug at a location adjacent to a said plug projection, said slit configured to provide resilient deformation of said base part.

10. A retainer device for retaining connecting pins in respective pin holes of a respective link element of a plurality of link elements, the link elements interconnected by the connecting pins which extend through the respective pin holes in each link element, each link element having a recess a side surface thereof and being adjacent to the pin hole, each link element further having a communication hole for communication between the recess and the pin hole, said retainer device comprising:

a plug which is configured to be retained by the link element, said plug configured for movement in a direction which intersects with an axial direction of the connecting pin, between a first position in which said plug is partly situated in the pin hole for preventing unintentional axial withdrawal of the connection pin from the pin hole, and a second position in which it is retracted from the pin hole for allowing an intended axial withdrawal of the connecting pin from the pin hole, said plug being accommodated in said recess and configured for movement toward and away from said pin hole, said plug having a proximal end comprising a base part configured for sliding movement in said recess, and a distal end comprising an extension configured for insertion into said communication hole, wherein said extension is moved into and retracted from the pin hole, as the base part is respectively moved in said recess toward and away from the pin hole; and a lock configured to retain said plug in said first position in which said distal end of the plug is positioned in the pin hole, said lock comprising plug projections on opposite side surfaces of said plug, and recess projections on opposite side surfaces of said recess, a said plug projection and a said recess projection configured to ride over each other as said plug is moved between said first position and said second position.

11. The retainer device as set forth in claim 10, wherein said plug projections are configured to be maintained in engagement with corresponding edges of the recess.

12. The retainer device as set forth in claim 10, wherein the lock means further comprises a slit in the base part of said plug at a location adjacent to a said plug projection, said slit configured to provide resilient deformation of said base part can be resiliently deformed.

13. A retainer device for retaining connecting pins in respective pin holes of respective link elements, the plurality of link elements interconnected by the respective connecting pins which extend through the respective pin holes in each link element, each link element having a recess in a side surface of said link element and being adjacent to the pin hole, and a communication bole for communicating between said recess with the pin hole, the retainer device comprising:

a plug configured to be retained by the link element, the plug being movable in a direction which intersects with an axial direction of the connecting pin, between a first position in which said plug is partly situated in the pin hole for preventing unintentional axial withdrawal of the connection pin from the pin hole, and a second position in which said plug is retracted from the pin hole for allowing intended axial withdrawal of the connecting pin from the pin hole, said plug being accommodated in said recess and configured for movement toward and away from said pin hole, said plug having a proximal end comprising a base part configured for sliding movement in said recess, and a distal end comprising an extension configured for insertion into said communication hole, wherein said extension is moved into and retracted from the pin hole, as the base part is respectively moved in said recess toward and away from the pin hole; and a lock configured to retain said plug in said first position in which said distal end of said plug is positioned in the pin hole, said lock comprising a plug projection on a side surface of said plug, and a recess projection on a side surface of said recess, said plug projection and said recess projection configured to ride over each other as said plug is moved between said first position and said second position.

14. The retainer device according to claim 13, wherein said plug projection and said recess projection each extend in a direction substantially orthogonal to the axial direction of the connecting pin.

15. The retainer device according to claim 13, wherein said plug is configured to be inserted into the recess of the link element in a direction substantially parallel to the axial direction of the connecting pin.

\* \* \* \* \*